United States Patent [19]

Zenner

[11] Patent Number: 5,378,376
[45] Date of Patent: Jan. 3, 1995

[54] SLUDGE COLLECTOR EMPLOYING FLOATING WEIR

[75] Inventor: John E. Zenner, East Troy, Wis.

[73] Assignee: Wisconsin Oven Corporation, East Troy, Wis.

[21] Appl. No.: 85,734

[22] Filed: Jul. 6, 1993

[51] Int. Cl.6 .............................................. B01D 21/24
[52] U.S. Cl. .................................... 210/776; 210/800; 210/122; 210/242.1; 210/540
[58] Field of Search .................. 210/122, 242.1, 242.3, 210/521, 538, 540, 776, 800, 105.1, 256; 415/71, 206; 416/176, 223 B

[56] References Cited

U.S. PATENT DOCUMENTS

| | | | |
|---|---|---|---|
| 2,579,304 | 12/1951 | Crawford | 210/242.1 |
| 2,655,868 | 10/1953 | Lindau et al. | 415/71 |
| 4,111,805 | 9/1978 | Van Pool et al. | 210/540 |
| 4,132,645 | 1/1979 | Bottomley et al. | 210/540 |
| 4,307,008 | 11/1981 | Baffert et al. | 210/242.3 |
| 4,454,035 | 6/1984 | Stefan | 210/242.1 |
| 4,551,246 | 11/1985 | Coffing | 210/540 |
| 4,713,181 | 12/1987 | Russell | 210/776 |
| 4,867,872 | 9/1989 | Russell et al. | 210/242.3 |
| 4,990,246 | 2/1991 | Blazejczak et al. | 210/122 |
| 5,015,393 | 5/1991 | Russell et al. | 210/525 |
| 5,059,312 | 10/1991 | Galletti | 210/122 |
| 5,078,863 | 1/1992 | Durigon | 210/242.1 |
| 5,122,280 | 6/1992 | Russell et al. | 210/540 |

FOREIGN PATENT DOCUMENTS 340152 12/1930 United Kingdom .
914102 12/1962 United Kingdom .

Primary Examiner—Christopher Upton
Attorney, Agent, or Firm—Nilles & Nilles

[57] ABSTRACT

A sludge collector includes a collection box disposed within a sludge holding tank containing a liquid and the sludge or other materials to be collected. A floating weir is positioned at the inlet of the box to control the depth of a stream of materials flowing into the box. The weir operates to automatically match the flow rate into the box to that out of the box without employing complex sensing or actuating mechanisms while at the same time assuring that adequate turbulence is created in the box to mix sludge with the liquid prior to removal. The weir is also designed so as to reliably handle sticky materials. Preferably, the pump is specially designed to handle sticky materials without clogging, and baffles are located upstream of the collector to facilitate prompt sludge collection.

16 Claims, 5 Drawing Sheets

SLUDGE COLLECTOR EMPLOYING FLOATING WEIR

BACKGROUND OF THE INVENTION

1. Field of the Invention

The invention relates to sludge collectors and, more particularly, relates to sludge collectors which are disposed in holding tanks containing sludge and which employ vertically adjustable weirs to control the flow rate of sludge into the collectors.

2. Discussion of the Related Art

Sludge collectors maybe used in, e.g., municipal waste treatment facilities, citrus and other food preparation facilities, and crude oil treatment facilities to remove floating materials from water or other liquids.

Sludge collectors may also be used in conjunction with spray painting facilities. In such facilities, objects ranging in size from a few square inches to one hundred square feet or more are spray painted in so-called "water wash paint booths" in which a water curtain is established behind the object being painted to remove paint particles from the air being pulled through the water curtain as it is exhausted. The wash water is typically drained into a holding tank where the particles of paint entrained by the water float to the surface where they may form a sludge film or curtain. These paint particles must be removed, particularly if the water from the tank is to be recirculated and reused in the paint booths, since the sludge could otherwise clog the booth recirculating pumps or other water handling components of the booths.

Sludge collectors used in the painting industry or other industries should be located and sized so as to promptly remove the floating materials, along with only as much surface water as is required to flow the materials into the collector. Prompt removal of sludge from the tank is essential to prevent the sludge from becoming saturated and sinking to the bottom of the tank, thus rendering removal more difficult. To oversize a collector is inefficient in terms of equipment, size, cost, as well as operating and maintenance expenses, and generally requires that equipment used in further in-line processing be larger and more expensive than necessary. Thus, attempts have been made to size sludge collectors and the discharge capacities of the pumps removing the sludge from the collectors according to the inflow required to draw floating materials into the collectors. However, pump discharge capacities may vary continuously during use because of, e.g., higher or lower percentages of sludge in the water in the collector. Water levels in the tank may also vary, thus altering the flow rate of sludge into the collector. Thus, the flow rate of the sludge into the collector must be altered to prevent flooding or emptying of the collector upon changes in inflow or outflow rates.

One device which may be used to control the flow rate of sludge into a collector is an adjustable weir positioned at the inlet of a sludge collection box. One such weir is disclosed in U.S. Pat. No. 4,867,872, which issued to Russell et al. on Sep. 19, 1989. The weir disclosed by Russell et al. is part of a weir box or collection box which is slidably mounted on vertical guides and connected to a pneumatic cylinder which can be actuated to raise and lower the weir box in an attempt to vary the depth of the sludge stream flowing into the box. The pneumatic cylinder is actuated, based upon the sensed difference in height between the top of the weir box and the level of water in the tank, in an effort to maintain a constant flow of water into the box.

The mechanism disclosed by Russell et al. exhibits several drawbacks and disadvantages. First, it is relatively complex and expensive to install and to operate because it requires relatively sophisticated sensing and actuating devices. Second, and perhaps more importantly, control of the actuator for the weir is based only upon the sensed sludge level in the tank without taking into account variations in sludge inflow or outflow rates to or from the box caused by variations in pump throughput or the inherent and often accumulative control tolerances of both the level sensor and the weir actuator. A further limitation of the mechanism disclosed by Russell et al. is that manual adjustment of a setscrew is required to even theoretically match the inflow rate to the outflow rate. These problems are further compounded by the fact that the weir box has a tendency to rise when the water level in the box is low and to sink when the water level in the box is high because the box is attached to a pneumatic cylinder the air in which is compressible. These tendencies run directly contrary to the control operations required to adjust inflow to outflows. Thus, depending upon the actual variations of inflow and outflow rates, altering the level of the weir often over-compensates or under-compensates for these variations, leading to an undesirable hunting effect which inevitably degrades the efficiency of the collector.

OBJECTS AND SUMMARY OF THE INVENTION

It is therefore an object of the invention to provide a sludge collector employing an adjustable weir operable to automatically and continuously adjust the flow rate of materials into the collector to match the flow rate of materials out of the collector.

It is another object of the invention to provide a sludge collector which is simple to construct and install and reliable in operation.

In accordance with one aspect of the invention, these objects are achieved by providing a sludge collector having a weir which floats in a collection box in response only to changes of water levels in the box to alter the depth of a stream of materials flowing into the box to match the inflow into the collector to the discharge of materials from the collector. The sludge collector includes the sludge collection box and the floating weir. The collection box includes an upper inlet, a lower reservoir, and a guide frame located between the inlet and the reservoir. The weir includes a weir frame slidably mounted in the guide frame, a weir crest which is mounted on the weir frame so as to be positionable above the upper inlet of the collection box, and a float which is operatively connected to the weir frame and at least a portion of which is located in the lower reservoir of the collection box.

Preferably, the weir frame comprises a weir plate having an upper edge attached to the weir crest and side edges slidably guided in the outer guide, and a weir cross guide attached to the outer surface of the front wall of the collection box in sliding contact with the weir plate to scrape accumulated sludge from the inner surface of the weir plate. A weir guide bar may be slidably guided in the inner guide to guide the float and to scrape accumulated sludge from the inner surface of the front wall of the collection box.

The float preferably includes a housing having a lower surface which is sloped upwardly from outer to inner ends thereof so as to prevent sludge from compacting between the housing and the floor of the collection box. A space is preferably formed between the weir crest and an upper surface of the float housing so as to permit sludge trapped between the weir plate and the front wall of the collection box, as well as sludge trapped between the wall of the float housing and the front wall of the collection box, to flow into the reservoir.

Still another object of the invention is to provide a method of removing floating materials from a sludge tank using a sludge collector which controls the flow rate of materials into the collector to match the flow rate of materials out of the collector.

In accordance with another aspect of the invention, this object is achieved by drawing the materials into a collection box having an inlet and a reservoir, removing the materials from the collection box, and controlling the flow of materials into the collection box by vertically moving a weir crest to adjust the depth of a stream of materials flowing into the collection box. The controlling step includes adjusting the height of the weir crest based upon the depth of materials in the reservoir as determined by the flow rate of materials out of the reservoir and the flow rate of materials into the reservoir.

Other objects, features, and advantages of the present invention will become more readily apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Resume

Figure 1:
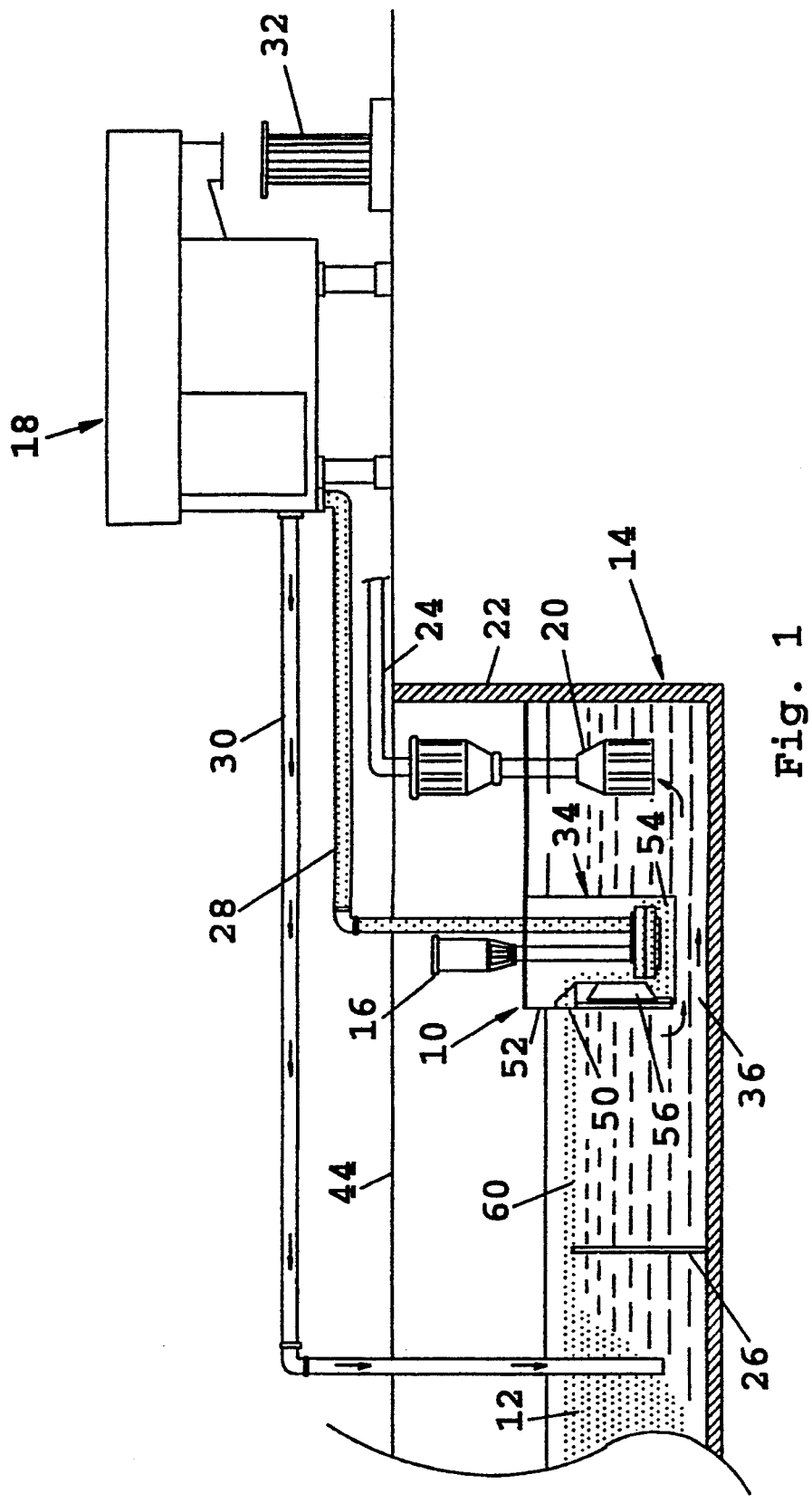
FIG. 1 schematically illustrates a sludge removal system incorporating a sludge collector constructed in accordance with the present invention.

Pursuant to the invention, a sludge collector is provided in the form of a collection box disposed within a sludge holding tank. A floating weir is positioned at the inlet of the box to control the depth of a stream of materials flowing into the box. The weir operates to automatically match the flow rate into the box to that out of the box without employing complex sensing or actuating mechanisms while at the same time assuring that adequate turbulence is created in the box to mix materials with the water or other liquid in the box prior to removal. The weir is also designed so as to reliably handle sticky materials. Preferably, the pump is specially designed to handle sticky materials without clogging, and devices are located upstream of the collector to facilitate materials collection.

System Overview

Referring now to the drawings and to FIGS. 1-4 in particular, a sludge collector 10 is provided for removing floatable sludge 12 from a holding tank 14. A sludge removal pump 16 is provided for removing sludge from the collector 10. The term "sludge" as used herein should be understood to mean any material which floats on or in water or any other suitable liquid. The term "tank" should be understood to encompass elevated tanks, recessed pits of the type illustrated, ponds, or any other space where water containing sludge may be located.

The sludge collector 10 in the illustrated embodiment is disposed in tank 14 receiving water from spray booths for painting. Accordingly, as is typical in such booths, the collector 10 is operated in concert with a separator 18 and recirculating pump 20. Depending upon the size of the tank 14, several collectors 10 and recirculating pumps 20 may be provided. Sludge collector 10 is located near an end wall 22 of tank 14, with the pumps 20 being located between the collector 10 and the end wall 22. Pumps 20 draw water in the tank 14 towards the end wall 22, thus directing floating sludge towards the collector 10. Preferably, one or more baffles 26 are provided upstream of the collector 10 to increase surface flow through the tank 14 thus (1) channeling sludge along the surface of the water in the tank to form a sludge curtain 60, and (2) eliminating "dead spots" where sludge could otherwise be overtreated or waterlogged, causing it to sink. Baffles 26 also serve to reduce turbulence in tank 14 and to restrict the passage of masses of sludge which are not yet floating.

Separator 18 is, per se, well known and includes an inlet connected to the outlet of the pump 16 by a feed pipe 28 and an outlet discharging water into the tank 14 upstream of the collector 10 via a discharge pipe 30. In operation, separator 18 removes the solid or liquid sludge from the water retrieved from the collector 10 in a manner which is, per se, well known and discharges the water and sludge into the tank 14 and into a suitable container 32, respectively.

Referring now to FIGS. 1-5, the sludge collector 10 comprises a collection box 34 which could be any enclosure but which in the illustrated embodiment is suspended or otherwise mounted on a support 35 in tank 14 so as to define a space 36 therebelow or elsewhere for the passage of water towards the pumps 20. Preferably, one or more guides 38 and 40 (FIG. 2) extend from the lateral edges of the collection box 34 to the side walls 42 and 44 of tank 14 so as to direct the sludge curtain 60 towards the opening of the collection box 34.

In operation, sludge in the form of paint or other materials in the tank 14 is drawn towards the end wall 22 by recirculating pumps 20 and is directed toward the surface of the tank by baffles 26, thus forming a sludge curtain 60 on the surface of the water in the tank 14. The sludge is directed into the collection box 34 of collector 10 by the guides 38 and 40, where it flows into the box 34 in a stream and is pumped into the separator 18 by the pump 16 and separated. Purified water is returned from the separator 18 to the tank 14 through discharge pipe 30, and water withdrawn from the tank by the recirculating pump 20 is pumped to the spray booth through discharge pipe 24 and then returned to the tank 14, where the process is repeated.

Sludge Collector and Weir

Figure 2:
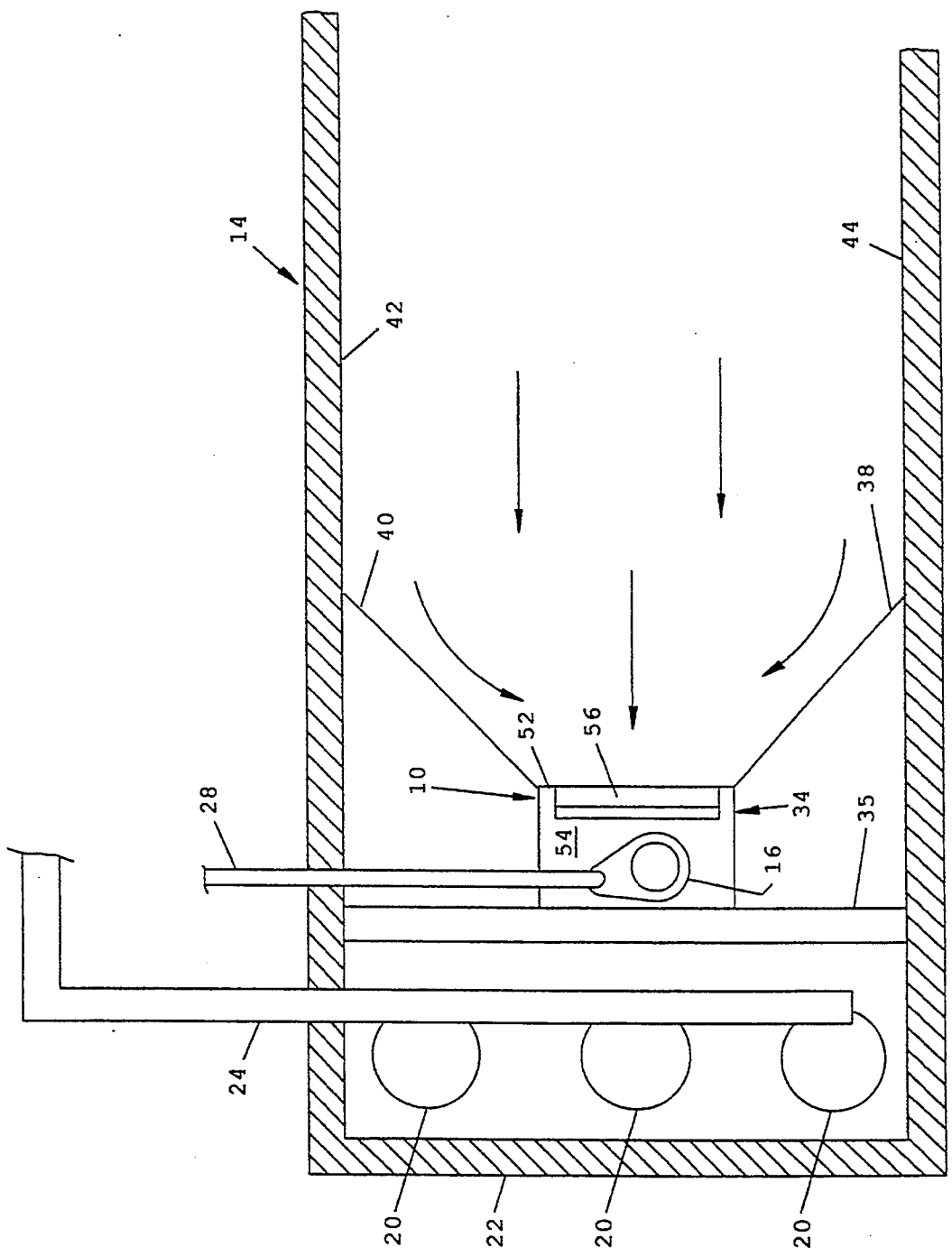
FIG. 2 is a plan view of a sludge collector and a portion of the surrounding system of FIG. 1.
Figure 3:
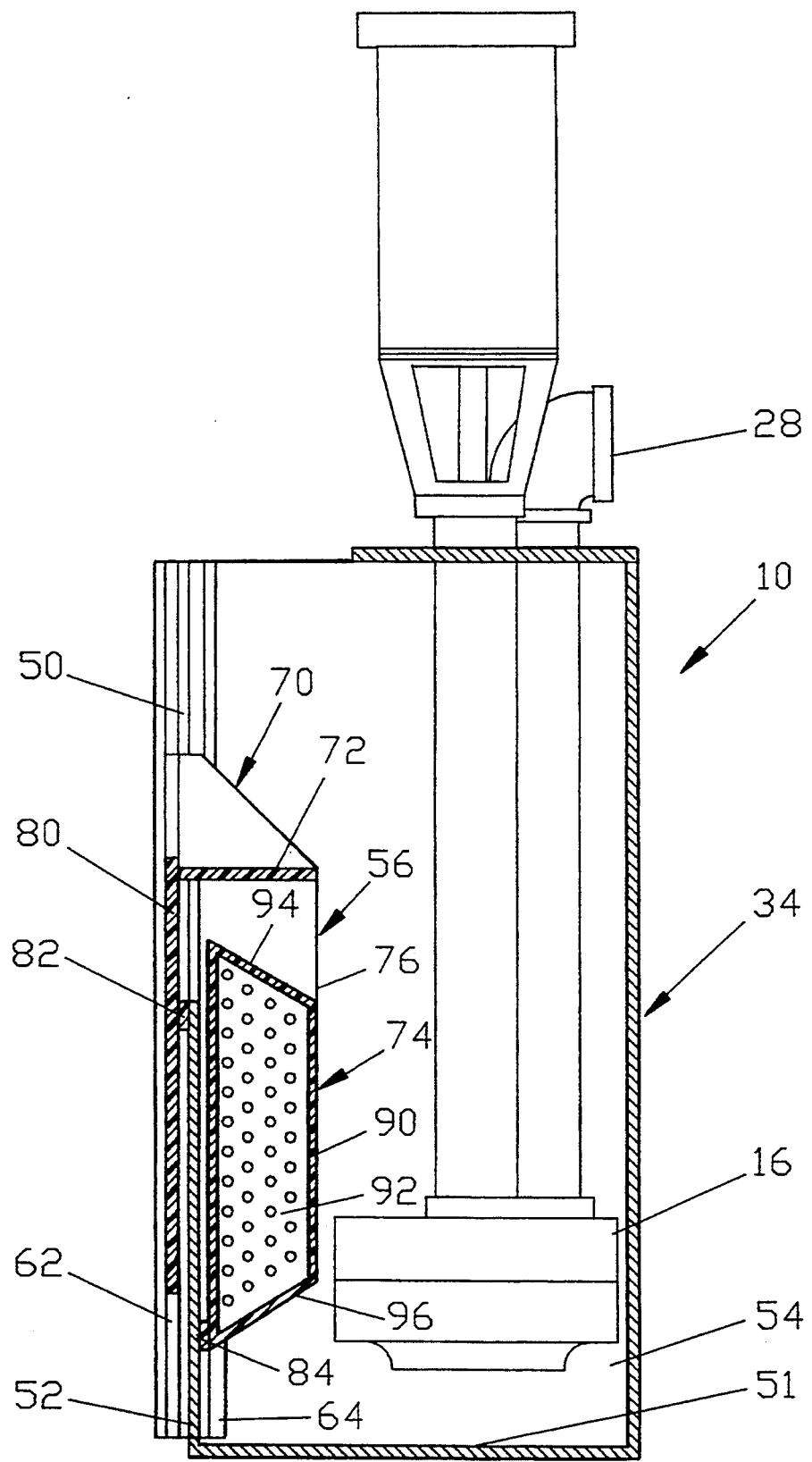
FIG. 3 is a sectional elevation view of the sludge collector of FIG. 2.
Figure 4:
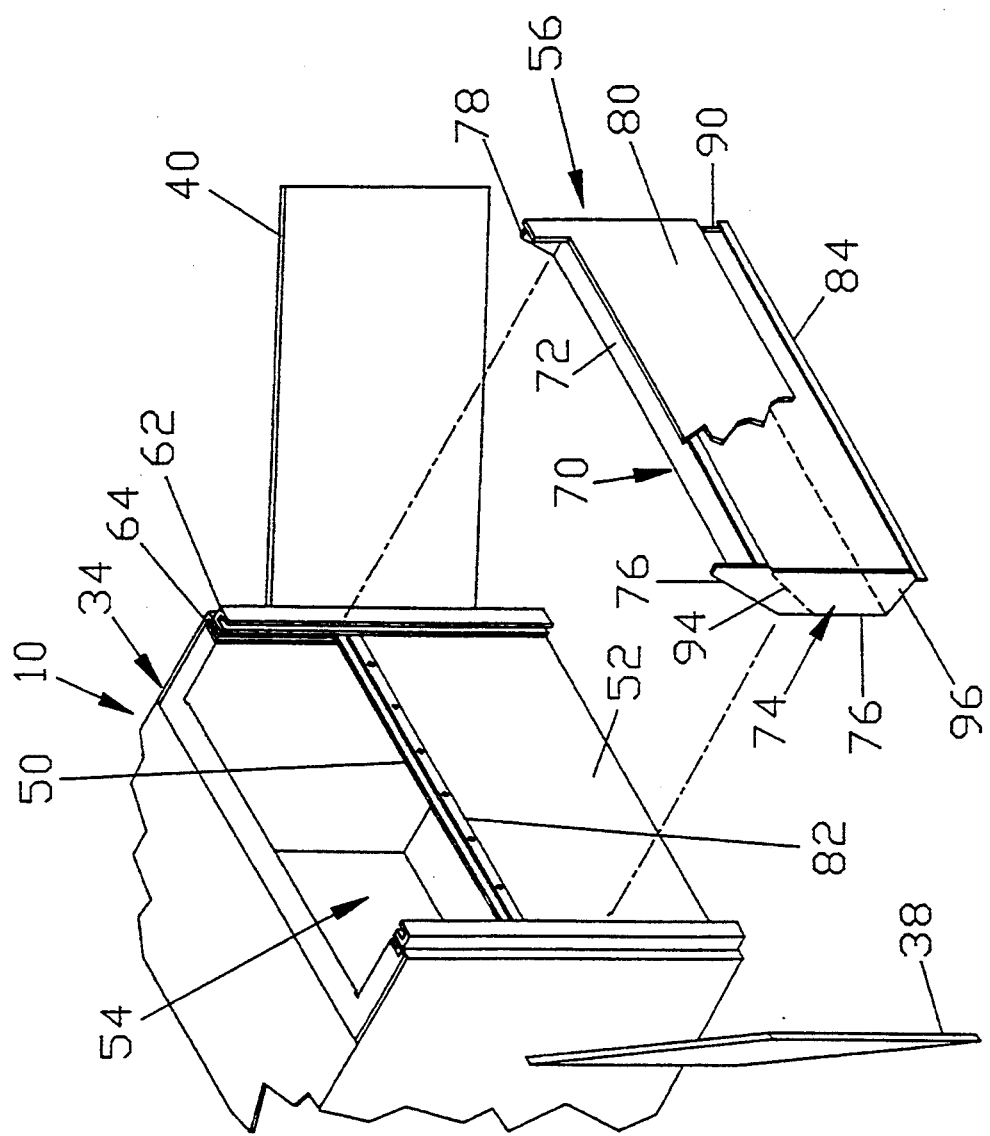
FIG. 4 is a perspective view of a portion of the assembly illustrated in FIGS. 2 and 3.

Referring now particularly to FIGS. 2-4, the collector 10 comprises the collection box 34, the pump 16, and a floating weir 56 which is vertically movable to control the depth of the stream of sludge flowing into the collection box 34. The pump 16 of the illustrated embodiment is located in the box 34 but could be located remote from the box 34 and connected to the box via a suitable feed pipe.

Collection box 34 has an inlet or opening 50 formed in the front wall 52 thereof and is fully enclosed in its lower end to define a reservoir 54 in which is disposed the pump 16. Preferably, the inlet 50 of collection box 34 is spaced from the reservoir 54 by a distance which is sufficient to ensure turbulent flow of sludge into the reservoir 54, thus assuring that the sludge is mixed with water in the reservoir and drawn into the pump 16 rather than merely floating on top of the water or other liquid in the collection box.

Floating weir 56 is slidably guided for vertical movement on a guide frame attached to the front wall 52 of collection box 34. The guide frame includes an outer guide 62 attached to the outer surface of wall 52 and an inner guide 64 attached to the inner surface of wall 52. Weir 56 further includes a frame 70, and a weir crest 72 and a float 74 attached to the frame 70. Preferably, all contacting surfaces of the weir 56 and the guides 62 and 64 are formed from a low friction material such as high density polypropylene or polyethylene which 1) aids the free movement of the weir 56 in the guides 62 and 64 and 2) inhibits the sticking of materials to the weir and weir guides.

Frame 70 includes opposed vertical side walls 76 and 78, a weir plate 80, and a weir guide bar 84. Weir plate 80 and weir guide bar 84 are slidably guided in the outer and inner guides 62 and 64, respectively, with relatively close tolerances. These tolerances, coupled with the relatively sharp corners of the plate 80 and the guide bar 84, assure that paint or other sludge accumulated in the guides is scraped upon movement of the weir 56, thus inhibiting jamming. The weir guide bar 84 guides the float 74 in guide 64 and cleans sludge from between the float 74 and the inside of the wall 52. A weir cross guide 82 is attached to an outer surface of front wall 52 of collection box and is in sliding contact with the inner surface of weir plate 80, thus preventing water from flowing between the space formed between the wall 52 and the plate 80 and into the collection box 34. Weir cross guide 82 also scrapes accumulated sludge from the inner surface of weir plate 80.

The weir crest 72 comprises a generally horizontal shelf having an outer edge attached to an upper edge of weir plate 80 and opposed ends attached to the respective side walls 76 and 78 of the frame 70 and extending rearwardly of the inlet 50 of the collection box 34. This shelf defines the depth of the stream of sludge flowing into the box 34 and assures that sludge flows directly into reservoir 54 as opposed to cascading down float 74.

Float 74 is designed to maintain the weir crest 72 at an optimum height while inhibiting sludge from clogging the weir or from compacting beneath the weir. To this end, float 74 is formed from a housing 90 defining an enclosed flotation chamber at least partially filled with a flotation material 92.

Housing 90 is attached at its opposed lateral edges to the side walls 76 and 78 of the frame 70 and at its lower edge to the weir guide bar 84. Of course, housing 90 need not be attached to the frame 70 as illustrated but only need be operatively connected to the frame so that vertical movement of the float results in corresponding movement of the weir crest 72. Housing 90 also has upper and lower edge surfaces 94 and 96 sloped towards the inside center of collection box 34 so as to prevent sludge from compacting between these surfaces and the crest 72 of the weir 56 and the floor 51 of the collection box 34, respectively. The highest point of the upper edge surface 94 is spaced from the bottom of the weir crest or shelf 72 by a sufficient distance to permit any sludge trapped between the inner surface of the weir plate 80 and the outer surface of wall 52 and between the outer surface of housing 90 and the inner surface of wall 52 to flow into the collection box 34.

Flotation material 92 may comprise any suitable buoyant material. In the illustrated embodiment, this material is a closed cell foam material which cannot become saturated if wet and which can thus still function even if there is some leakage into the housing 90.

In operation, the sludge curtain 60 floating on or near the top of the water or other liquid in tank 14 is directed towards the inlet 50 in the front wall 52 of collection box 34 and flows in a stream over the weir crest or shelf 72 at a depth determined by the height of the weir crest 72 relative to the depth of water or other liquid in tank 14. Sludge flowing into the reservoir 54 is mixed with water and withdrawn by the pump 16 at an outflow rate determined by the capacity of the pump, the density of the sludge being discharged, and the setting of any flow control valves in discharge pipe 28 or the setting of any pump motor speed control device. As the flow rate out of collection box 34 varies, causing the sludge level in reservoir 54 to vary, the weir 56 moves up and down in guides 62 and 64 to match the flow rate of sludge into the collection box 34 to that out of the box. Similarly, if the level of the water in the tank 14 changes, the depth of the stream of materials flowing into the box 34 likewise changes, altering the flow rate of the sludge into the box 34 and thus changing the depth of the sludge in the reservoir 54. This changing depth will again cause the weir 56 to rise or fall accordingly, thus once again matching the inflow rate to the outflow rate. Also, if materials accumulate and partially block the flow of materials into the box 34, the resultant reduction of inflow will cause the weir 56 to fall, thus clearing the blockage.

It can thus be seen that the weir 56 automatically and continuously senses the water level in the box 34 to balance inflow rates and outflow rates based on the depth of sludge in the box. Devices which were heretofore available such as that disclosed by the Russell et al. patent discussed above merely sense the relative distance between the weir crest and the water level in the tank and position the weir at a level which is assumed to provide the required inflow rate. Since real-world conditions seldom if ever meet such assumed criterion, the position of the weir in such a prior art device must be varied many times and/or mechanical adjustments must be made to provide the desired inflow rate each time the flow characteristics into or out of the collection box changes. The precise positioning of the weir crest enabled by the present invention permits the use of much longer weirs in sludge collection systems, thus permitting higher sludge collection rates.

If a particularly sticky sludge such as paint is being removed by the collector 10, it may be desirable to employ a special pump which can reliably remove such sludge without clogging. One such pump will now be described.

Single Vane Impeller Pump

Figure 5:
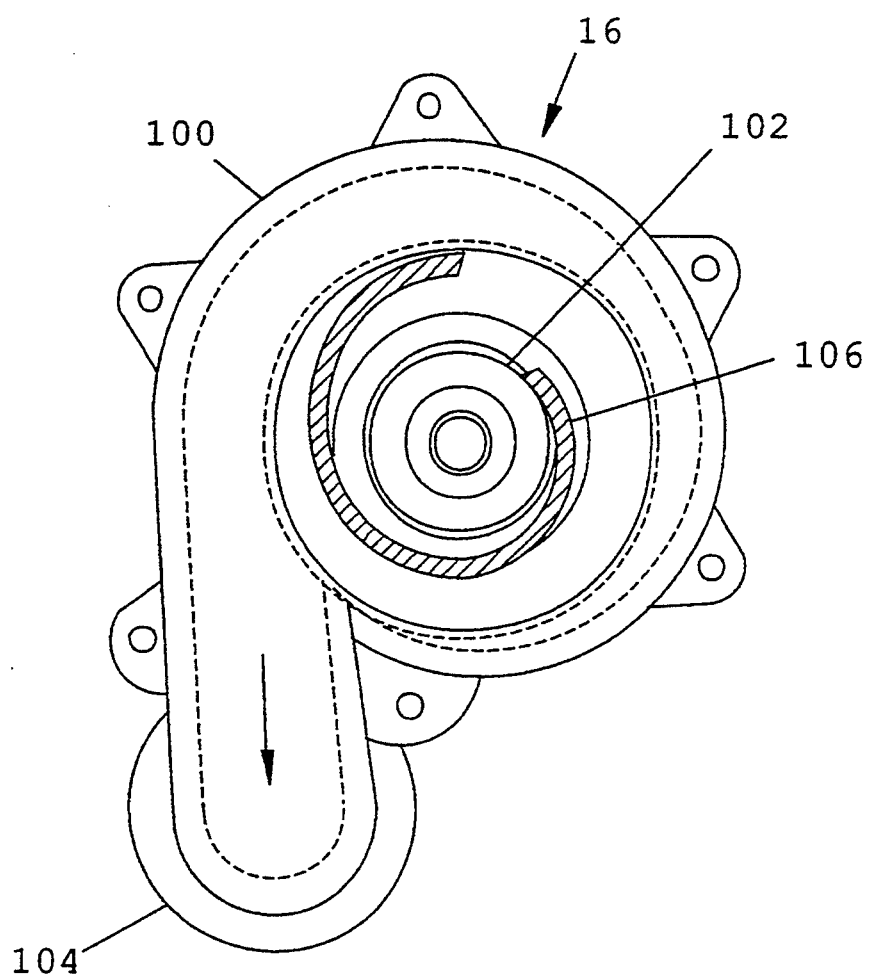
FIG. 5 is a bottom plan view of a pump usable with the sludge collector of FIGS. 1-4.

Referring now to FIG. 5, the pump 16 is a centrifugal pump designed to provide positive or near positive displacement while reliably handling a very sticky material such as paint. Pump 16 includes a pump housing 100 having a generally cylindrical central axial inlet 102 and a radial outlet 104. Disposed within the housing 100 is a single vane impeller 106. The vane of impeller 106 has a generally spiral shape and wraps around about 270° from the inlet 102 of the housing towards the outlet 104 in a direction opposite to impeller rotation. This single vane extends through essentially the full depth of the housing 100 and thus fills nearly the entire inner cavity of the housing and at least approaches positive displacement. Operation of this impeller is not significantly impeded if material being pumped sticks to the vane because adequate space remains within the housing to accommodate the required volume of sludge. In addition, due to the fact that there is only one vane, shearing of the sludge is minimized. Minimization of shearing is important because material which has been sheared by an impeller tends to lose buoyancy and thus may become difficult to separate from water in the separator 18. Pump 16 is thus better suited to handle sticky materials than are conventional multi-vane centrifugal pumps or double diaphragm pumps typically used in sludge collectors.

Many changes and modifications could be made to the present invention without departing from the spirit and scope thereof. For instance, as discussed above, the disclosed sludge collector need not be located in the type of tank disclosed or used in conjunction with paint booths, but could instead be used in virtually any application in which floating materials must be collected and separated from water. In addition, the guide assemblies and the location and shape of the disclosed weir could be altered so long as the weir remains operable to match the flow of materials into the collection box to those out of the collection box. Other changes and modifications which could be made to the invention without departing from the spirit and scope thereof will become more readily apparent from the appended claims.

What is claimed is:

1. A sludge collector comprising:
    A. a sludge collection box including
        (1) a front wall having an upper inlet formed therein,
        (2) a lower reservoir, and
        (3) a guide frame located between said inlet and said reservoir, said guide frame including inner and outer guides flanking said front wall; and
    B. a floating weir for controlling the flow of sludge into said collection box, said weir including
        (1) a weir frame slidably mounted in said guide frame, said weir frame including
            (A) a weir plate having side edges slidably guided in said outer guide of said collection box,
            (B) a weir guide bar slidably guided in said inner guide of said collection box, and
            (C) opposed side walls which support said weir plate and said weir guide bar,
        (2) a weir crest which is mounted on said side walls of said weir frame so as to be positionable above said upper inlet of said collection box, and
        (3) a float which is operatively connected to said weir frame and at least a portion of which is located in said lower reservoir of said collection box.

2. A sludge collector as defined in claim 1, further comprising a pump having an inlet communicating with said lower reservoir of said collection box.

3. A sludge collector as defined in claim 1, wherein said weir plate has an upper edge attached to said weir crest.

4. A sludge collector as defined in claim 1, wherein said float comprises
    A. a housing defining a floatation chamber, and
    B. a closed cell foam material at least partially filling said floatation chamber.

5. A sludge collector as defined in claim 4, wherein a space is formed between said weir crest and an upper surface of said housing.

6. A sludge collector as defined in claim 5, wherein said housing has a lower surface which is sloped upwardly from outer to inner ends thereof.

7. A sludge collector comprising:
    A. a sludge collection box including
        (1) an upper inlet,
        (2) a lower reservoir, and
        (3) a guide frame located between said inlet and said reservoir;
    B. a floating weir for controlling the flow of sludge into said collection box, said weir including
        (1) a weir frame slidably mounted in said guide frame,
        (2) a weir crest which is mounted on said weir frame so as to be positionable above said upper inlet of said collection box, and
        (3) a float which is operatively connected to said weir frame and at least a portion of which is located in said lower reservoir of said collection box; and
    C. a pump having an inlet communicating with said lower reservoir of said collection box, wherein said pump is located in said lower reservoir and has an impeller formed from a single spiral vane.

8. A sludge collector comprising:
    A. a sludge collection box including
        (1) front wall having an upper inlet formed therein,
        (2) a lower reservoir, and
        (3) a guide frame located between said inlet and said reservoir, said guide frame including inner and outer guides flanking said front wall; and
    B. a floating weir for controlling the flow of sludge into said collection box, said weir including
        (1) a weir frame slidably mounted in said guide frame, said weir frame including a weir plate having side edges slidably guided in said outer guide,
        (2) a weir crest which is mounted on said weir frame so as to be positionable above said upper inlet of said collection box, wherein said weir plate has an upper edge which is attached to said weir crest, and (3) a float which is operatively connected to said weir frame and at least a portion of which is located in said lower reservoir of said collection box, wherein said weir frame further comprises a weir cross guide having an outer surface in sliding contact with said weir plate and an inner surface attached to an outer surface of said front wall of said collection box.

9. A sludge collector comprising:
A. a sludge collection box including
   (1) an upper inlet, and
   (2) a lower reservoir; and
B. means for controlling the flow rate of sludge into said sludge collector, said means for controlling comprising
   (1) a weir crest the height of which controls the rate of sludge flow into said collection box through said upper inlet, and
   (2) float means, connected to said weir crest and at least partially positioned in said lower reservoir, for adjusting the height of said weir crest based upon the depth of sludge in said reservoir as determined by
      (A) the flow rate of sludge out of said reservoir; and
      (B) the flow rate of sludge into said collection box through said upper inlet; and
C. a pump having an inlet communicating with said lower reservoir of said collection box, wherein said pump is located in said reservoir and has an impeller formed from a single spiral vane.

10. A sludge collector comprising:
A. a sludge collection box including
   (1) an upper inlet,
   (2) a lower reservoir,
   (3) a front wall at least a portion of which is located beneath said inlet, and
   (4) a guide frame extending from said inlet to said reservoir, said guide frame including an outer guide located in front of an outer surface of said front wall and an inner guide located behind said front wall; and
B. a floating weir for controlling the flow of sludge into said collection box, said weir including
   (1) a weir crest comprising a weir shelf which is positionable above said upper inlet of said collection box and which extends rearwardly from said inlet,
   (2) a weir frame slidably mounted in said guide frame, said weir frame including
      (A) a weir plate having an upper edge attached to said weir shelf and side edges slidably guided in said outer weir guide,
      (B) a weir cross guide having an outer surface in sliding contact with said weir plate and an inner surface attached to an outer surface of said front wall of said collection box, and
      (C) a weir guide bar slidably guided in said inner guide,
   (3) a housing attached to said weir frame, said housing having a floatation chamber formed therein and extending from said reservoir towards said weir shelf with a space being formed between said weir shelf and an upper edge of said housing to permit the passage of sludge from a rear surface of said weir plate into said collection box, said housing having a lower surface which is sloped upwardly from outer to inner ends thereof, and
   (4) a closed cell foam material at least partially filling said floatation chamber.

11. A sludge collection system comprising:
A. a sludge tank;
B. a sludge collection box provided in said sludge tank, said sludge collection box including
   (1) an upper inlet,
   (2) a lower reservoir, and
   (3) a guide frame located between said inlet and said reservoir;
C. a pump, having an inlet communicating with said sludge tank at a location downstream from said collection box, for causing water in said sludge tank to flow into said upper inlet of said collection box;
D. a floating weir for controlling the flow of sludge into said collection box, said weir including
   (1) a frame slidably mounted in said guide frame,
   (2) a weir crest which is mounted on said frame and which is positionable above said upper inlet of said collection box, and
   (3) a float which is attached to said frame beneath said weir crest and at least a portion of which is located in said lower reservoir of said collection box; and
E. a second pump for withdrawing sludge from said sludge tank, wherein said second pump is located within said reservoir and has an impeller formed from a single spiral vane.

12. A sludge collection system as defined in claim 11, further comprising a baffle provided in said sludge tank upstream from said collection box.

13. A method of removing floating sludge from a sludge tank, comprising:
A. drawing said sludge into a collection box having an inlet and a reservoir;
B. removing said sludge from said collection box via operation of a pump which is located in said reservoir and which has an impeller formed from a single spiral vane; and
C. controlling the flow of sludge into said collection box by vertically moving a weir crest to adjust the depth of a stream of sludge flowing into said collection box, said controlling step including adjusting the height of said weir crest based upon the depth of sludge in said reservoir as determined by
   (1) the flow rate of sludge out of said reservoir, and
   (2) the flow rate of sludge into said reservoir.

14. A sludge collector comprising:
A. a sludge collection box including
   (1) a front wall having an upper inlet formed therein,
   (2) a lower reservoir, and
   (3) a guide frame located between said inlet and said reservoir and including inner and outer guides flanking said front wall;
B. means for controlling the flow rate of sludge into said sludge collector, said means for controlling comprising
   (1) a floating weir which includes
      (A) a weir frame including
         (i) a weir plate having side edges slidably guided in said outer guide of said collection box,
         (ii) a weir guide bar slidably guided in said inner guide of said collection box, and (iii) opposed side walls which support said weir plate and said weir guide bar, and (B) a weir crest which is mounted on said side walls of said weir frame and the height of which controls the rate of sludge flow into said collection box through said upper inlet, and (2) float means, connected to said weir crest and at least partially positioned in said lower reservoir, for adjusting the height of said weir crest based upon the depth of sludge in said reservoir as determined by (A) the flow rate of sludge out of said reservoir; and (B) the flow rate of sludge into said collection box through said upper inlet.

15. A sludge collection system comprising:

A. a sludge tank;

B. a sludge collection box provided in said sludge tank, said sludge collection box including (1) a front wall having an upper inlet formed therein, (2) a lower reservoir, and (3) a guide frame located between said inlet and said reservoir and including inner and outer guides flanking said from wall;

C. a pump, having an inlet communicating with said sludge tank downstream from said collection box, for causing water in said sludge tank to flow into said upper inlet of said collection box;

D. a floating weir for controlling the flow of sludge into said collection box, said weir including (1) a frame slidably mounted in said guide frame, said frame including (i) a weir plate having side edges slidably guided in said outer guide of said collection box, (ii) a weir guide bar slidably guided in said inner guide of said collection box, and (iii) opposed side walls which support said weir plate and said weir guide bar, (2) a weir crest which is mounted on said side walls of said frame and which is positionable above said upper inlet of said collection box, and (3) a float which is attached to said frame beneath said weir crest and at least a portion of which is located in said lower reservoir of said collection box.

16. A sludge collector comprising:

A. a sludge collection box including (1) an upper inlet, and (2) a lower reservoir;

B. a floating weir, slidably mounted on said collection box, for controlling the flow of sludge into said collection box, said weir including (1) a weir frame slidably mounted on said collection box, (2) a weir crest which is mounted on said weir frame so as to be positionable above said upper inlet of said collection box, and (3) a float which is operatively connected to said weir frame and at least a portion of which is located in said lower reservoir of said collection box; and C. a pump having an inlet communicating with said lower reservoir of said collection box, wherein said pump is located in said lower reservoir and has an impeller formed from a single spiral vane.

* * * * *